UNITED STATES PATENT OFFICE.

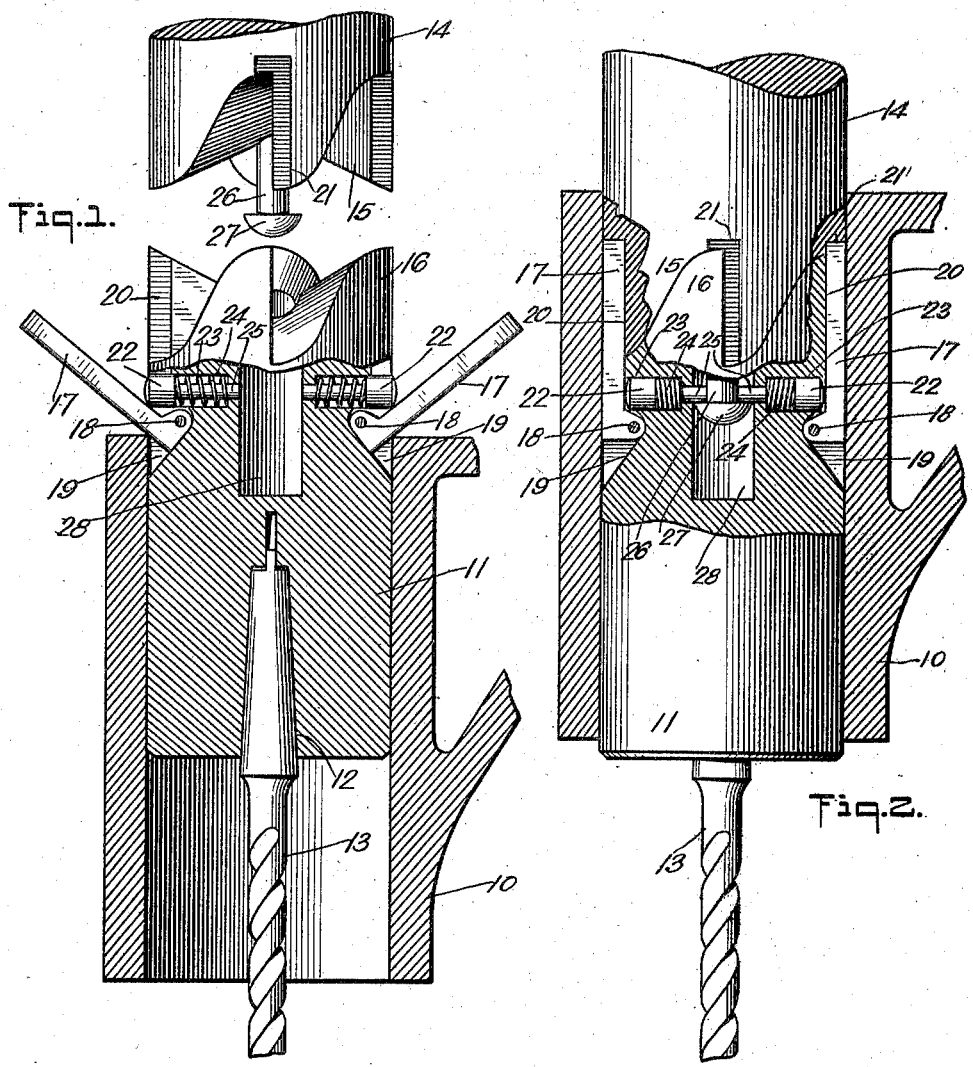

CHARLES EUGENE COX, OF SAN PEDRO, CALIFORNIA.

MACHINE-DRILL.

1,275,857.   Specification of Letters Patent.   Patented Aug. 13, 1918.

Application filed April 2, 1918.   Serial No. 226,210.

*To all whom it may concern:*

Be it known that I, CHARLES EUGENE COX, a citizen of the United States, and a resident of San Pedro, in the county of Los Angeles and State of California, have invented a new and Improved Machine-Drill, of which the following is a description.

My invention is intended more particularly as an improvement on an invention forming the subject matter of an application, filed by me May 17, 1917, Serial Number 169,222 in which a chuck carrier is equipped with a series of chucks and the carrier is movable to position any particular chuck beneath the drill spindle. In my aforenamed machine the chucks are adapted to be raised or lowered by the spindle in the engagement and disengagement of the latter, and latches are provided on each chuck together with spring means normally tending to throw the latches to an outer position and in engagement with the carrier when the chucks are raised, whereby to support the chuck in the raised position on the carrier when the chuck is disengaged from the spindle.

The present invention relates to an improved latch means and to the spring-acted controlling means therefor as well as the manner of effecting the engagement between the latches and the spindle, the purpose of the present invention being to improve the latch means and controlling means with respect to durability and to insure a positive operation of the latches in an effective manner.

Reference is to be had to the accompanying drawings forming a part of this specification.

Figure 1 is a partly sectional side elevation showing a fragment of a chuck carrier, a chuck, and a portion of the drill spindle, said chuck and spindle embodying the present invention and the parts being shown with the chuck detached from the spindle and supported on the carrier;

Fig. 2 is a similar view with the chuck in the lowered position in the carrier and engaged by the spindle;

Fig. 3 is a plan view of the chuck latches in the outer position;

Fig. 4 is an end view of the spindle.

The numeral 10 indicates a carrier which may be of any suitable form, such for example, as shown in my aforenamed application. In the carrier is a vertically movable chuck 11, one chuck only being illustrated. The chuck is, in practice, provided with any suitable means such as a socket 12 to receive a drill 13 or other tool. The numeral 14 indicates a portion of the drill spindle. The said spindle and the chuck 11 have mating clutch elements 15, 16. Latches 17 are provided on the chuck, being pivoted at their lower ends to the chuck as at 18 and adapted to swing outward to engage the top of the carrier 10 or to swing inwardly and move with the chuck within the carrier as indicated in Fig. 2. The features referred to correspond in general with the similar features in the machine disclosed in my forenamed application.

In the present application the pivoted lower ends of the latches 17 are accommodated in lateral recesses 19 in the chuck and the latches in the inner position are accommodated in slots 20 in the chuck at the exterior and registering slots 21 in the spindle 14 to lie within the cylindrical surfaces of the chuck and spindle. The latches in the present construction are adapted to be forced outwardly by transverse, radially disposed pins 22 accommodated in radial recesses 23 in the chuck 11 and the reduced shanks 25 of the pins have coiled springs 24 thereon, said springs abutting at their outer ends against the heads of the pins 22 and at their inner ends against the inner walls of the recesses 23. Thus, the tendency of the springs 24 is to press the heads of the pins outwardly, laterally against the latches 17, thereby tending to throw said latches to the outer position of Fig. 1.

On the spindle 14 at the lower end is a depending axial pin 26 having an enlarged head 27 at the lower end presenting a shoulder at the upper side of the head. In the lowered position of the spindle into engagement with the chuck the pin 26 and its head 27 are accommodated in a central pocket 28 formed in the upper end of the chuck 11.

With the described construction when a chuck 11 is brought beneath the spindle 14 and said spindle brought to the lowered position to engage the clutch elements 15, 16, the pins 26, will extend into the pocket 28 with the head 27 below the pins 22. In the downward movement of the clutch into the carrier 10 under the pressure of the spindle, the latches 17 will be forced inwardly, thereby moving the pins 22 inwardly to project the inner ends of the pins into the pocket 28 above the head 27, the action serving to compress the springs 24 as indicated in Fig. 2. Thus, when the spindle again rises the engagement of the head 27 with the pins 22 will carry the clutch 11 upwardly to the raised position of Fig. 1, permitting the reaction of the springs 24 to force the pins 22 outwardly, thus throwing the latches 17 outward over the top of the carrier 10 to thereby support the chuck 11 in the raised position.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a machine drill, a chuck carrier, a chuck vertically movable in said carrier, a drill spindle adapted for vertical movement to engage or disengage the chuck, a latch pivoted on the chuck and swingable from an inner position to an outer position into engagement with the carrier when said chuck is in the raised position and supported on the carrier and disengaged from the spindle, a transverse spring-pressed pin on the chuck, said pin normally tending to throw the latch to said outer position, and being movable laterally inward in the chuck with an inward movement of the latch, and a member on the lower end of the spindle adapted to be locked by said pin in the inner position of the latter.

2. In a machine drill, a chuck carrier, a chuck vertically movable in said carrier, a spindle adapted for vertical movement to engage or disengage the chuck, a latch pivoted at its lower end on the chuck to swing from an inner position to an outer position into engagement with the carrier for supporting the chuck, an axial pin on the lower end of the spindle, said pin having an enlarged head presenting a shoulder at its upper side, and a spring-pressed pin on the chuck normally tending to throw the latch to the outer position, the pin being movable by an inward movement of the latch to engage the said head.

3. In a machine drill, a chuck carrier, a chuck vertically movable in the carrier, a plurality of latches pivoted at their lower ends on the chuck to swing from an inner position to an outer position into engagement with the carrier when the chuck is in the raised position, to thereby support the chuck on the carrier, a drill spindle above the chuck adapted to move axially to engage or disengage the chuck, said spindle and chuck having registering recesses adapted to accommodate the latches, spring-pressed pins radially disposed in the chuck and normally tending to force said latches to their outer positions, the chuck having in the upper end thereof a central pocket and the pins being movable inwardly by the latches to project into said pocket when the latches are swung inwardly, and a depending member central on the spindle and adapted to be accommodated in said pocket when the spindle engages the chuck, said depending member being adapted to be engaged by the spring-pressed pins when the latter are projected into said pocket.

4. The combination with a chuck carrier, a chuck vertically movable in the carrier, a latch pivoted on the chuck to swing outward and engage the carrier and thereby support the chuck, a drill spindle above the chuck and movable axially to engage or disengage the chuck, and a spring-pressed pin normally tending to swing the latch to the outer position and movable into engagement with said spindle by an inward swinging of the latch upon a downward movement of the chuck in the carrier.

CHARLES EUGENE COX.

Copies of this patent may be obtained for five cents each, by addressing the "Commissioner of Patents, Washington, D. C."